US 8,315,170 B2

(12) United States Patent
Grayson

(10) Patent No.: US 8,315,170 B2
(45) Date of Patent: Nov. 20, 2012

(54) SYSTEM AND METHOD FOR SIGNALING INFORMATION IN ORDER TO ENABLE AND DISABLE DISTRIBUTED BILLING IN A NETWORK ENVIRONMENT

(75) Inventor: Mark Grayson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1702 days.

(21) Appl. No.: 10/914,399

(22) Filed: Aug. 9, 2004

(65) Prior Publication Data
US 2006/0029084 A1 Feb. 9, 2006

(51) Int. Cl.
H04W 4/24 (2009.01)
(52) U.S. Cl. .................... 370/236; 370/310; 455/405
(58) Field of Classification Search .............. 370/229, 370/230, 231, 235, 236, 310; 455/403, 405, 455/406, 408
See application file for complete search history.

(56) References Cited

U.S. PATENT DOCUMENTS

| | | | |
|---|---|---|---|
| 5,905,736 A | 5/1999 | Ronen et al. | 370/546 |
| 5,956,391 A | 9/1999 | Melen et al. | 379/114 |
| 5,970,477 A | 10/1999 | Roden | 705/32 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,175,879 B1 | 1/2001 | Shah et al. | 709/330 |
| 6,230,012 B1 | 5/2001 | Willkie et al. | 455/435 |
| 6,295,447 B1 | 9/2001 | Reichelt et al. | 455/417 |
| 6,343,084 B1 * | 1/2002 | Christie | 370/466 |
| 6,442,165 B1 * | 8/2002 | Sitaraman et al. | 370/395.4 |
| 6,480,485 B1 * | 11/2002 | Kari et al. | 370/352 |
| 6,718,179 B1 * | 4/2004 | Forssell et al. | 455/509 |
| 6,728,208 B1 * | 4/2004 | Puuskari | 370/230.1 |
| 6,738,348 B1 * | 5/2004 | Rollins | 370/230 |
| 7,366,127 B2 * | 4/2008 | Einola et al. | 370/328 |
| 7,551,583 B1 * | 6/2009 | Gazzard | 370/331 |
| 2001/0043571 A1 * | 11/2001 | Jang et al. | 370/260 |

(Continued)

FOREIGN PATENT DOCUMENTS

WO    WO 98/26381    12/1997

(Continued)

OTHER PUBLICATIONS

PCT, "Notification of Transmittal of the International Search Report and the Written Opinion of the International Searching Authority, or the Declaration," International Application No. PCT/US05/26314, 11 pgs, Jul. 25, 2005.

(Continued)

*Primary Examiner* — Michael Thier
*Assistant Examiner* — Curtis A Alia
(74) *Attorney, Agent, or Firm* — Baker Botts L.L.P.

(57) ABSTRACT

An apparatus for signaling information in a network environment is provided that includes an access gateway operable to establish one or more packet data protocol (PDP) links on behalf of an end user. The access gateway is operable to communicate a message associated with a change in quality of service, locale, or policy enforcement relating to a selected one of the PDP links to a client services packet gateway (CSPG). The CSPG responds to the message by providing an accounting command for the selected PDP link such that synchronization is achieved between accounting information and a state associated with the selected PDP link.

30 Claims, 2 Drawing Sheets

U.S. PATENT DOCUMENTS

| | | | |
|---|---|---|---|
| 2002/0036983 A1* | 3/2002 | Widegren et al. | 370/230.1 |
| 2002/0059114 A1 | 5/2002 | Cockrill et al. | 705/27 |
| 2002/0068545 A1* | 6/2002 | Oyama et al. | 455/406 |
| 2002/0120749 A1* | 8/2002 | Widegren et al. | 709/227 |
| 2002/0127995 A1* | 9/2002 | Faccinn et al. | 455/406 |
| 2002/0150084 A1* | 10/2002 | Lee et al. | 370/352 |
| 2002/0152319 A1 | 10/2002 | Amin et al. | 709/232 |
| 2002/0176378 A1* | 11/2002 | Hamilton et al. | 370/328 |
| 2002/0191597 A1* | 12/2002 | Lundstrom | 370/356 |
| 2003/0051041 A1 | 3/2003 | Kalavade et al. | 709/229 |
| 2003/0147392 A1* | 8/2003 | Hayashi et al. | 370/390 |
| 2004/0037269 A1* | 2/2004 | Lundin | 370/352 |
| 2005/0177733 A1* | 8/2005 | Stadelmann et al. | 713/185 |
| 2008/0095119 A1* | 4/2008 | Bachmann et al. | 370/332 |

FOREIGN PATENT DOCUMENTS

| | | |
|---|---|---|
| WO | WO 99/31610 | 12/1998 |

OTHER PUBLICATIONS

3GPP TS 23.207 V6.3.0 (Jun. 2004), "3rd Generation Partnership Project; Technical Specification Group Services and System Aspects; End-to-end Quality of Service (QoS) concept and architecture," (Release 6), 53 pages.

3GPP TS 29.208 V6.0.0 (Jun. 2004), "3rd Generation Partnership Project; Technical Specification Group Core Network; End-to-end Quality of Service (QoS) signalling flows," (Release 6), 32 pages.

\* cited by examiner

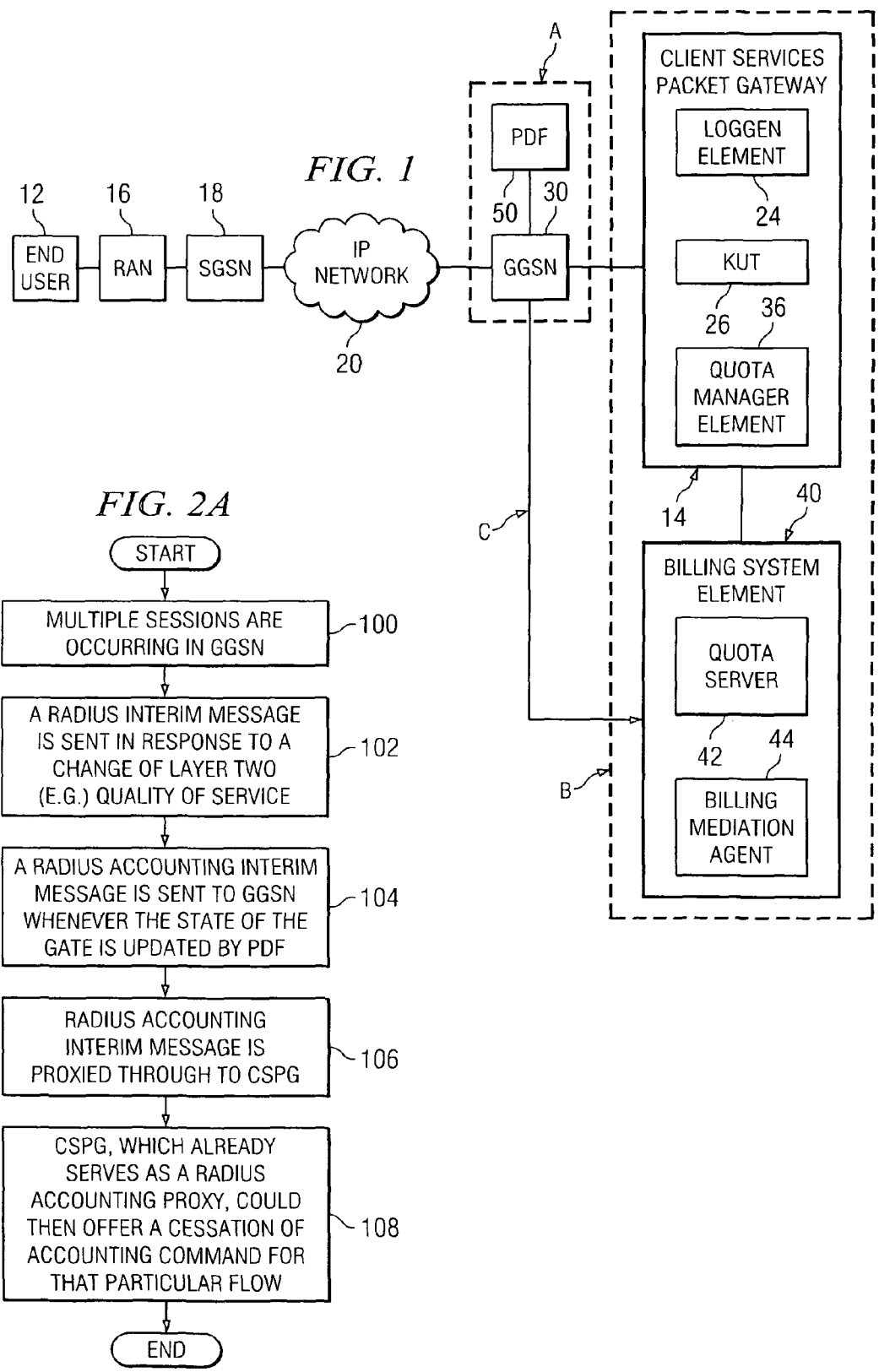

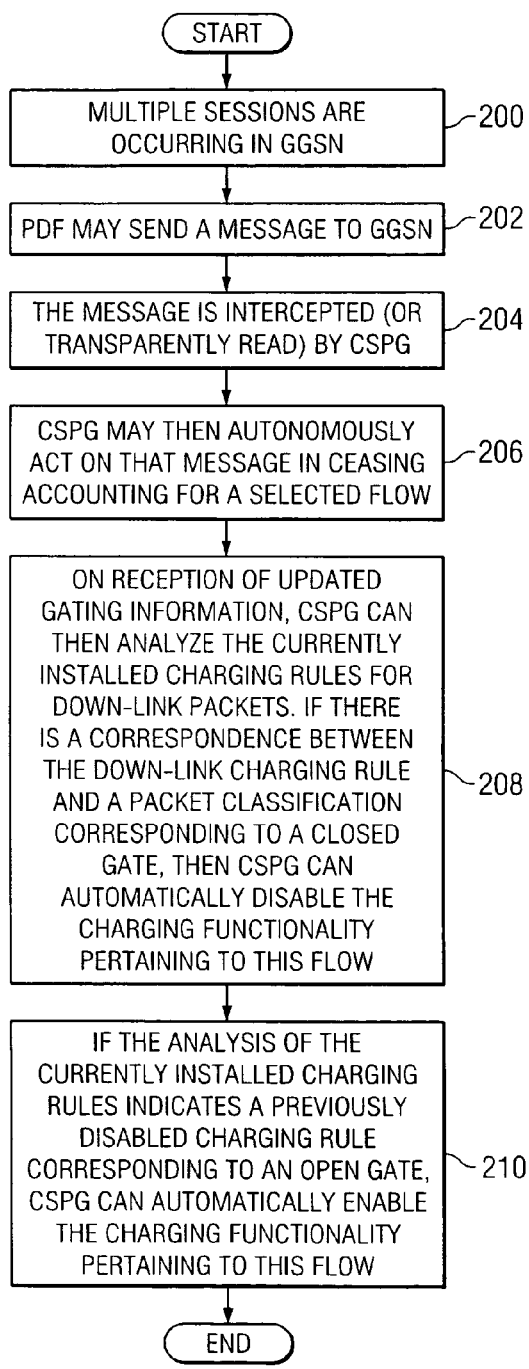
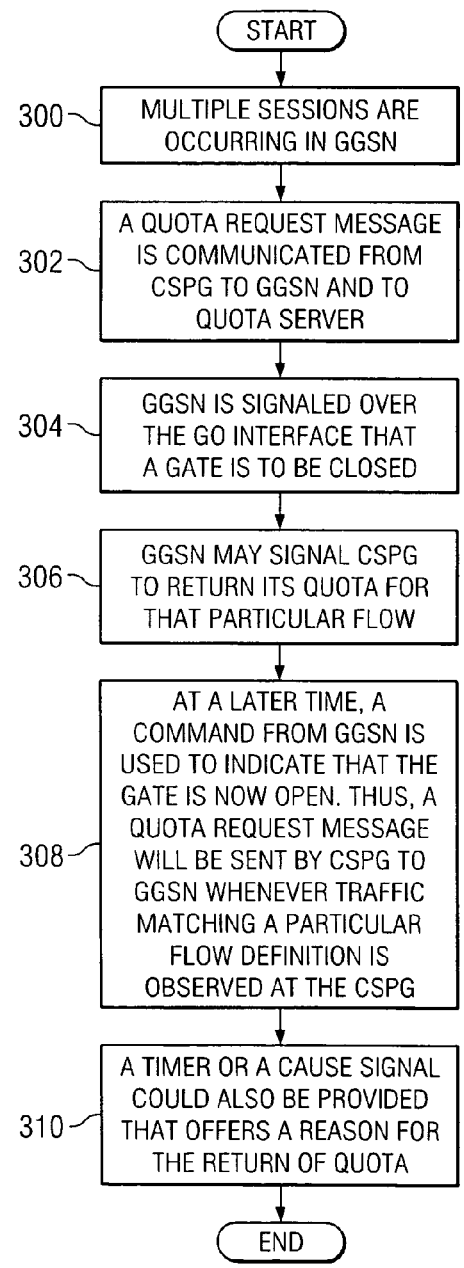

SYSTEM AND METHOD FOR SIGNALING INFORMATION IN ORDER TO ENABLE AND DISABLE DISTRIBUTED BILLING IN A NETWORK ENVIRONMENT

TECHNICAL FIELD OF THE INVENTION

This invention relates in general to the field of communications and, more particularly, to a system and method for signaling information in order to enable and disable distributed billing in a network environment.

BACKGROUND OF THE INVENTION

Networking services have become increasingly important in today's society. One feature of networking services relates to client or source awareness. Certain services, functions, or capabilities may be provided to a group of end users or to clients based on a corresponding source profile or policy. Devices or components within a network must generally be able to identify such a profile or policy before offering selected enhanced services, functions, or capabilities to a targeted group of end users. Accordingly, sufficient information must be made available at specific times in order to allow for an accurate identification of a flow and, further, to bill for that flow accordingly.

As the subscriber base of end users increases and/or becomes mobile, proper routing and efficient management of communication sessions and data flows becomes even more critical. In some environments, policy, locale or service level may be unknown, inaccurate, or ambiguous at various times during a communication session. This deficiency may create synchronization issues where an end user may be incorrectly billed or where other users may have access to certain information that should not be made available to them. Thus, the ability to properly manage accurate billing information in a network environment, while achieving optimal synchronization amongst network components, presents a significant challenge to system designers, component manufacturers, and network operators.

SUMMARY OF THE INVENTION

From the foregoing, it may be appreciated by those skilled in the art that a need has arisen for an improved communications approach that provides improved signaling for selected network equipment. In accordance with one embodiment of the present invention, a system and a method for relaying information in order to enable or to disable services in a network environment are provided that greatly reduce disadvantages and problems associated with conventional communications techniques.

According to one embodiment of the present invention, there is provided an apparatus for signaling information in a network environment that includes an access gateway operable to establish one or more packet data protocol (PDP) links on behalf of an end user. The access gateway is operable to communicate a message associated with a change in quality of service level, locale, or policy relating to a selected one or more of the PDP links to a client services packet gateway (CSPG). The CSPG responds to the message by providing an accounting command for the one or more selected PDP links such that synchronization is achieved between accounting information and a state associated with the selected PDP link. In other embodiments, this signaling may involve other network equipment, or be provided in a different fashion, as more fully detailed below.

Certain embodiments of the present invention may provide a number of technical advantages. For example, according to one embodiment of the present invention, a communications approach is provided that allows for the implementation of 3GPP functionality using an independent charging (or billing) function. This would achieve compliance for a number of architectures that implement a service based local policy protocol. Such conformity could readily be achieved with minimal overhead and with few changes to existing configurations. Thus, such a change is convenient for network operators who may seek to update their existing network configurations with such a functionality.

Another technical advantage associated with one embodiment of the present invention relates to the arrangement of the proffered architecture. The configuration of the present invention, as explained more fully below, allows billing functions to be tightly coupled to the state of the packet data protocol links in an associated access gateway. This produces the targeted synchronization, which can be a problem for any network operator or system user. Moreover, a device or a component within a network environment is readily able to identify a session belonging to a given end user and to charge that flow properly. This allows receiving devices and components within the network environment to provide any number of appropriate quality of service levels for a group of end users. Thus, an increased granularity is provided by such a communications configuration: allowing for greater specificity in terms of the treatment of data flows or packets. Moreover, such granularity may be achieved accurately and without inhibiting bandwidth parameters, sacrificing time, or restricting processing speeds. This is a result of the ability of appropriate signaling to simply relay pertinent information to selected network equipment, which can respond by disabling or enabling specific functions.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and the features and advantages thereof, reference is made to the following description, taken in conjunction with the accompanying figures, wherein like reference numerals represent like parts, in which:

FIG. 1 is a simplified block diagram of a communications system for enabling and disabling billing in a network environment in accordance with one embodiment of the present invention; and FIGS. 2A-2C are simplified flowcharts that illustrate some of the various implementations and signaling that may be included in the communication system.

DETAILED DESCRIPTION OF EXAMPLE EMBODIMENTS

FIG. 1 is a simplified block diagram of a communication system 10 for signaling information in a network environment. Communication system 10 includes an end user 12, a radio access network (RAN) 16, a serving general packet radio service (GPRS) support node (SGSN) 18, and an internet protocol (IP) network 20. Additionally, communication system 10 includes a gateway GPRS support nodes (GGSN) 30 and a client services packet gateway (CSPG) 14. GGSN 30 may be coupled to a policy decision function (PDF) 50. In addition, CSPG 14 may include a loggen element 24, a known user table (KUT) 26, and a quota manager element 36. Communication system 10 may additionally include a billing system element 40 that may include a quota server 42 and a billing mediation agent (BMA) 44.

FIG. 1 may be generally configured or arranged to represent a 2.5 G communication architecture applicable to a Global System for Mobile (GSM) environment in accordance with a particular embodiment of the present invention. However, the 2.5 G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a billing function being provided for any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more CSPG devices could be implemented in any such network/access technology.

For purposes of teaching and discussion, it is useful to provide some overview as to the way in which the following invention operates. The following foundational information may be viewed as a basis from which the present invention may be properly explained. Such information is offered earnestly for purposes of explanation and discussion only and, accordingly, should not be construed in any way to limit the broad scope of the present invention and its potential applications.

Access gateways (such as GGSN 30) generally provide network access to end users 12 (e.g. mobile stations) by terminating GTP tunnels initiated by SGSN 18. Version 1.0 of the GTP protocol allows mobile stations to open multiple packet data protocols (PDPs) within these GTP tunnels. The secondary PDPs are sub-tunnels intended to be used to provide differentiated quality of service (QoS) for traffic flowing through them.

Thus, GGSN 30 can generally provide network access to end user 12 (e.g. via a mobile station) by terminating GTP tunnels initiated by SGSN 18. The GTP protocol may allow mobile stations to open multiple PDPs within these GTP tunnels. Secondary PDPs are sub-tunnels intended to be used to provide differentiated QoS for traffic flowing through them. When opening a secondary PDP, a mobile station can specify a traffic flow template (TFT) that defines the traffic pattern, which in turn governs the treatment of traffic that the mobile station will send through this PDP. The TFT may define, for example, the L3-L4 information (IP address and ports) as well as a desired QoS for this PDP.

The TFT information (or any significant portion thereof) may be stored in GGSN 30 to offer per-PDP QoS to the mobile station (i.e. end user 12). GGSN 30 may be configured to relay the TFT information into backend flows (e.g. RADIUS, terminal access controller access system (TACACS), DIAMETER, and GTP') to other interested network elements. The TFT information element may consist of source/destination IP addresses, source/destination ports, a protocol identifier, an IPSec security parameter index, a type of service/traffic class, etc. This allows other network elements that are gathering information (via RADIUS proxy or a GTP' interface to GGSN 30) to properly classify and provide differentiated services to traffic on each secondary PDP.

An example of such a service to be provided is differentiated billing. If end user 12 opens two PDPs, one for basic internet connectivity and the other with a higher QoS for a voice application, downstream service gateways could bill the voice application at a higher rate. This could be accomplished by matching user traffic to a TFT-defined L4 profile learned by an interested service gateway via (for example) RADIUS or GTP'. Thus, GGSN 30 is equipped to relay the TFT traffic profile data (i.e. traffic pattern information) associated with secondary PDPs through its control path interfaces (GTP', RADIUS, etc). This enables interested service gateways in the control path (e.g. CSPG 14) to deliver per-PDP differentiated services. GGSN 30 adds TFT profile info to the GTP' and RADIUS interfaces. CSPG 14 could then begin parsing this info and begin applying differentiated services per-PDP.

3GPP service based local policy (SBLP) defines additional functionality which allows: 1) the establishment of secondary PDP contexts to be authorized; 2) the packet classification/binding for secondary PDP context (overriding the traffic flow template provided by the mobile station); 3) the (unidirectional) gating control; and 4) the transfer of charging identities between an application and a selected GGSN. The gating control refers to a functionality, which defines whether to pass or to (silently) discard packets corresponding to a packet flow.

In an implementation of charging, it is important that a bearer flow billing functionality does not account for (downlink) packets, which are subsequently dropped at GGSN 30 (i.e. due to the operation of such gating functionality). Communication system 10 defines a technique, whereby information pertaining to the state of the gate can be exported from GGSN 30 to an external charging element (corresponding to CSPG 14) in any number of suitable ways. In addition, such an architecture offers an enhanced charging functionality within a charging element, which allows activation/de-activation of down-link charging rules which correspond to the packets being gated by GGSN 30.

Note that usage of the term "access gateway" in this document refers to GGSN 30 in one example, but could include any number of additional terms that can be included in a broad definition of an access gateway (e.g., a network access server (NAS)). In addition, the terms "billing" or "charging" refer to any element associated with accounting. The broad term "accounting" encompasses such elements, as well as additional objects (e.g., crediting or debiting) as explained more fully below.

Thus, there is a gate control in the access gateway. The gate control can be used for quality of service or for policy control. This gating can prevent theft of service by controlling a gate to the media and then by synchronizing that gate with call control. Most peer to peer protocols allow for a negotiation such that two end points can resolve how they will communicate with each other. In addition, SBLP can define a gate corresponding to a given media, to download the gate onto the access gateway, and to open and close the gate in synchronization with the call signaling.

Note that this represents only one example of how a flow could be treated. In other examples associated with discarding, a gate could be closed such that down-link packets are dropped at GGSN 30. However, in certain scenarios, certain packets may have already passed the charging gateway functionality such that packets have already been charged to an end user's account. Thus, a technique (inclusive of appropriate signaling) is needed to synchronize the access gateway with the charging or billing element (e.g. CSPG 14). Hence, a problem exists in ensuring that the down-link packet is not billed: the uplink packet not presenting a problem because it would have already been gated in the access gateway.

In accordance with the teachings of the present invention, communication system 10 provides a platform that achieves proper signaling to accommodate appropriate accounting. When SBLP is activated on GGSN 30, PDF 50 controls the gating function associated with a packet flow. The state of this gating function for down-link packets is generally required to be known by an external charging element (i.e. CSPG 14). This allows for the implementation of a 3GPP functionality using an independent charging function. This further allows such charging functions to be tightly coupled to the state of gating control in an associated GGSN.

Communication system 10 addresses problems associated with prior systems by allowing GGSN 30 to exchange signaling with other network elements (e.g. CSPG 14, PDF 50, quota server 42, etc.) at any appropriate time (e.g. when the PDP is created, modified, torn down, passes through a given element, etc.). A backend control protocol (e.g., TACACS, RADIUS or a proprietary protocol) can be leveraged to deliver this information to network equipment that may seek to know or to utilize this information. Once this procedure is completed, each service element is capable of delivering accurate billing information for a given end user. Details relating to specific implementations of such signaling are provided below with reference to FIGS. 2A-2C.

Referring back to FIG. 1, End user 12 is a client or a customer wishing to initiate a communication session or a data flow in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 16 is a communications interface between end user 12 and SGSN 18. RAN 16 may comprise a base transceiver station and a base station controller. The communications interface provided by RAN 16 offers connectivity and allows data to be exchanged between end user 12 and any number of selected elements within communication system 10. RAN 16 facilitates the delivery of a request packet generated by end user 12 and the reception of information sought by end user 12. RAN 16 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and GGSN 30 and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSN 30 are network elements that cooperate in order to facilitate a communication session involving end user 12. GGSN 30 is a communication or network node that may be working in conjunction with multiple SGSNs 18 to provide a communications medium in a GPRS service network environment. GGSN 30 may be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, frame relay, or any other suitable applications or platforms to operate over GSM connections.

Note that because certain enhancements should be made to several network components to achieve the targeted signaling of the present invention, it is critical to explain their internal structures. In a particular embodiment of the present invention, GGSN 30, CSPG 14, and/or quota server 42 may include software that is operable to facilitate appropriate signaling to any interested piece of network equipment or to any appropriate network location. The augmentation or enhancement may be provided in just one of these elements, two elements, or in all three elements. Such design choices may be based on particular networking or configuration needs. Alternatively, this signaling capability may be provided by any suitable hardware, component, device, application specific integrated circuit (ASIC), field-programmable gate array (FPGA), micro-processor, read only memory (ROM) element, random access memory (RAM) element, erasable programmable ROM (EPROM), electrically erasable programmable ROM (EEPROM), processor, algorithm, element or object that is operable to perform such operations. Note that such a signaling functionality may be provided external to GGSN 30, CSPG 14, and/or quota server 42 allowing appropriate accounting to be achieved for interested components in the network.

CSPG 14 is an accounting element that also represents a client-aware device, which may provide or offer some service or feature to end user 12. Such services may be based on an effective mapping between a source IP address of a given request packet and a user profile. Client-aware devices may key off the source IP address in providing services to a end user 12. There are a number of reasons why a device or a component would want to identify end user 12. For example, some devices may wish to identify end user 12 for authorization or quality of service purposes. In another example, a device may wish to maintain user profiles to provide for accounting records (for example per-user accounting) or to provide for content billing operations. Alternatively, a device or a component may use an identification to provide for any other type of suitable client-aware service, tool, or feature according to the particular needs of network components or equipment. Additional services may be related to areas such as routing, accounting, firewalling, filtering, or any other suitable parameters or policies where user-aware characteristics serve as a basis for service implementation.

CSPG 14 represents a generic piece of network equipment that can facilitate some type of accounting service for communication system 10. CSPG 14 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. This may be inclusive of simple routers, switches, loadbalancers, gateways, bridges, or any other piece of network equipment where appropriate and based on particular needs. CSPG 14 represents any component, device, element or object that can benefit from having suitable signaling information provided to it such that appropriate billing may be disabled or enabled.

As described above, CSPG 14 utilizes the identity of the client or the end user to provide services based on a source profile. In a particular embodiment of the present invention, CSPG 14 provides client-aware services by operating at networking layers two and three. Accordingly, the information available at networking layers two and three provides a basis for the identification of an end user or a client. CSPG 14 may use an IP address or any other suitable parameter to uniquely identify a client or an end user in offering a service, enhanced capability, or feature to an end user. CSPG 14 may include any suitable hardware, software, components, or elements that identify a unique identifier in order to provide some networking feature or capability to an end user.

CSPG 14 is a network element that may be inserted into a data flow that may view, extract, identify, access, or otherwise monitor information included within the data flow. CSPG 14 may handle the enforcement of access, quota distribution, and accounting that is provided by the information retrieved from elements included within billing system element 40. CSPG 14 may generally deduct quota after it has been properly allocated and, subsequently, retrieve additional quota when that quota allocation has been consumed. In a general sense, CSPG 14 may be responsible for quota enforcement for end user 12.

In operation of an example embodiment, CSPG 14 may extract IP source address information associated with end user 12. The IP source address may be used to determine an identity (or profile) of end user 12 that may be stored in KUT 26. Alternatively, CSPG 14 may extract or identify any information within the data flow that provides a correlation between end user 12 and a given data flow. CSPG 14 may also be a client-aware device that provides or offers some service or feature to end user 12. Such services may be based on an effective mapping between a source IP address of a given address packet and a user profile or information associated with end user 12. CSPG 14 may utilize a source IP address in providing services or features to end user 12. CSPG 14 may include a RADIUS component that may receive RADIUS updates and parse the updates. In addition, CSPG 14 may execute some action based on the RADIUS updates it receives. CSPG 14 may be provided with accounting, authorization and authentication (AAA) capabilities where appropriate. Alternatively, these capabilities may be provided external to CSPG 14, for example, in a AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, quality of service (QoS), firewalling, content filtering, or any other suitable parameters or policies where user-aware characteristics serve as a basis for a network service implementation.

Loggen element 24 is a storage element operable to build billing records and to communicate the billing records to BMA 44 based on information provided by KUT 26. Even in cases where the information returned by KUT 26 reflects a null (e.g., no active BMA), this may still be used to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to CSPG 14. KUT 26 may be consulted as additional billing records are created in order to determine that BMA 44 should receive selected billing records. KUT 26 may also include an application program interface (API) that may be implemented in order to obtain user ID information for an IP address from a data flow.

Quota manager element 36 is an element that manages quota information for services subscribed to by end user 12. Quota manager element 36 also provides an interface between GGSN 30 and billing system element 40 and may receive a communication that indicates a change in locale, e.g., corresponding to a change in SGSN 18. Quota manager element 36 may also identify new and old identifiers or pointers for selected locales involved in the communication session and notify billing system element 40. Quota manager element 36 may also communicate with billing system element 40 in order to exchange information associated with funding for end user 12. Quota manager element 36 may also receive RADIUS updates from GGSN 30 that reflect the current status associated with end user 12.

Billing system element 40 is an object that manages the billing and access policies associated with a given end user 12. In one embodiment, billing system element 40 includes quota server 42 and BMA 44. CSPG 14 may communicate with billing system element 40 in order to retrieve information or to learn of billing policies for end user 12. BMA 44 coordinates billing records and quota server 42 can be used to debit a selected amount of quota from an end user account.

It is critical to note that billing system element 40 (and its internal components such as quota server 42) may include any suitable elements, hardware, software, objects, or components capable of effectuating their operations or additional operations where appropriate. Additionally, any one or more of the elements included in CSPG 14 and billing system element 40 may be provided in an external structure or combined into a single module or device where appropriate. Moreover, any of the functions provided by these two elements may be offered in a single unit or single functionalities may be arbitrarily swapped between CSPG 14 and billing system element 40. The embodiment offered in FIG. 1 has been provided for purposes of example only. The arrangement of elements (and their associated operation(s)) may be reconfigured significantly in any other appropriate manner in accordance with the teachings of the present invention.

PDF 50 is a logical policy decision element that can use standard IP mechanisms to implement SBLP in the IP bearer layer. These mechanisms may be conformant to, for example, the framework defined in IETF [RFC 2753], where PDF 50 is effectively representing a policy decision point. PDF 50 can make decisions in regard to SBLP using policy rules, and, further, to communicate these decisions to GGSN 30, which can represent the IP policy enforcement point.

FIGS. 2A-2C are example flowcharts that illustrate a number of possibilities that communication system 10 may implement in order to provide appropriate accounting for a given end user 12. FIGS. 2A-2C represent three distinct solutions that may be used to address a number of deficiencies in existing architectures. The tendered schematic diagrams provide a way to indicate to CSPG 14 that packets will be discarded or dropped and, further, offer a way to achieve synchronization between gating and call information. It should be recognized that any number of approaches could be implemented in order to correct some of the shortcomings of existing systems that fail to provide accurate gating and accounting protocols. The subsequent procedures offer just a few examples of suitable signaling between the elements of communication system 10 to achieve the proper charging/gating functionality.

Note that for purposes of clarity, FIGS. 2A-2C illustrate a number of scenarios (identified as 'A,' 'B,' and 'C' in FIG. 1) that represent particular data exchanges between one or more network elements. For example, appropriate signaling between PDF 50 and GGSN 30 could be executed, whereby further signaling could be provided from GGSN 30 to CSPG 16. This first implementation is illustrated as scenario A, which is further detailed below with reference to FIG. 2A.

Scenario A, reflected by FIG. 2A, uses RADIUS messaging between selected components in communication system 10 in this example arrangement. Note that there could be multiple sessions that are occurring in GGSN 30 at any given time. Thus, there are several layer-twos within GGSN 30, as illustrated by step 100. Hence, there is an overall authentication session (e.g. in order to get an IP address), but there is also an accounting session per layer two. The gate, for which synchronization is being attempted, corresponds to a layer two flow. What is already defined in such a scenario is a process, which sends a RADIUS interim message in response to a change of layer two (e.g.) quality of service, as is illustrated by step 102. That functionality can be augmented in order to facilitate the necessary signaling needed in scenario A.

Therefore, in the first case, the RADIUS accounting interface is augmented in GGSN 30 and a RADIUS accounting interim message is sent whenever the state of the gate is updated by PDF 50, as illustrated by step 104. The state of the gate (open/close) together with the corresponding down-link packet flow identifiers may then be included in this RADIUS accounting interim message and proxied through to CSPG 14, as illustrated by step 106. Thus, the RADIUS accounting interim message is provided that indicates that the gate for that particular layer two flow has closed. This message can be received by GGSN 30 and relayed to CSPG 14, which already serves as a RADIUS accounting proxy. CSPG 14 could then stop billing or charging (i.e. a cessation of accounting command) for that particular flow, as illustrated by step 108. The message relayed to the CSPG 14 in step 106 can also include information on whether the CSPG 14 should immediately trigger the reporting of the used and un-used quota back to the quota server 42 (step not shown). Note that in this scenario, as well as others, a timer or a cause signal could also be provided that offers a reason for the return of quota.

Scenario B, that involves signaling between CSPG 14 and billing system element 40, may implement a common open policy service (COPS) protocol, which generally supports a client/server interface between a policy enforcement point within GGSN 30 and PDF 50. The COPS protocol can allow both push and pull operations. For the purpose of the initial authorization of QoS resources, the pull operation could be used. Subsequently, the interactions between PDF 50 and GGSN 30 may use either pull or push operations. Policy decisions may be stored by the COPS client in a local policy decision point allowing GGSN 30 to make admission control decisions without requiring additional interaction with PDF 50.

Hence, the information associated with gating control can be transported between PDF 50 and GGSN 30 on an interface called the GO interface. This is generally run over a COPS provisioning protocol, where there is a policy information base that defines the actual gate (i.e. whether the gate is open or closed). This information can be passed between PDF 50 and GGSN 30. Instead of having GGSN 30 reconstruct the message in a RADIUS accounting message, a proxy functionality could be used, whereby CSPG 14 becomes aware of the gating functionality. A transparent proxy could be provided on the GO interface to achieve this result.

Therefore, in a second case as illustrated in FIG. 2B, CSPG 14 acts as a COPS-PR proxy on the interface between PDF 50 and GGSN 30. The proxying of COPS-PR information (including the state of the gate control in the COPS-PR decision message) is used to provide CSPG 14 with complete information concerning the gating control, packet classification, and charging correlation information.

Thus, at a first step 200, multiple sessions may be occurring in GGSN 30 (similar to the case of FIG. 2A). At steps 202 and 204, PDF 50 may send a message to GGSN 30 and the message may be intercepted (or transparently read) by CSPG 14. CSPG 14 may then autonomously act on that message in ceasing accounting for a selected flow, as illustrated by step 206. On reception of updated gating information, CSPG 14 can then analyze the currently installed charging rules for down-link packets. If there is a correspondence between the down-link charging rule and a packet classification corresponding to a closed gate, then CSPG 14 can automatically disable the charging functionality pertaining to this flow. This is illustrated by step 208.

Similarly, if the analysis of the currently installed charging rules indicates a previously disabled charging rule corresponding to an open gate, CSPG 14 can automatically enable the charging functionality pertaining to this flow, as illustrated by step 210. This scenario could involve an enhancement to CSGP 14, which may be provided in any suitable element, as previously explained above.

Scenario C may implement a proprietary signaling between GGSN 30 and quota server 42, whereby either (or both) of these elements may be augmented to account for this functionality. In scenario C, GGSN 30 can be used as a proxy quota server. As in the other scenarios, scenario C may begin with multiple sessions occurring in GGSN 30, as illustrated by step 300. The quota request message may be communicated from CSPG 14 to GGSN 30 and to quota server 42 (at step 302). Thus, GGSN 30 is signaled (over the GO interface) that a gate is to be closed at step 304. Then GGSN 30 may signal CSPG 14 to return its quota for that particular flow at step 306. This signaling should generally be tagged because CSPG 14 needs to understand that it should administratively stop this flow and simply request more quota at a future time. This is because down-link traffic is still generally flowing.

At a later time, a command form GGSN 30 may be used to indicate to CSPG 14 that the gate is now open. Thus, a quota request message will be sent by the CSPG 14 to the GGSN 30 whenever traffic matching a particular flow definition is observed at the CSPG 14 as illustrated by step 308. As in the other examples provided, a timer or a cause signal could also be provided that offers a reason for the return of quota, as illustrated by step 310.

It is critical to note that some of the steps illustrated in FIGS. 2A-2C may be changed or deleted where appropriate and additional steps may also be added to the flowcharts. These changes may be based on specific communication architectures or particular interfacing arrangements and configurations of associated elements and do not depart from the scope or the teachings of the present invention. The interactions and operations of the elements within billing system element 40 and CSPG 14, as disclosed in FIGS. 2A-C, have provided merely one example for their potential applications. Numerous other applications may be equally beneficial and selected based on particular networking needs.

Although the present invention has been described in detail with reference to particular embodiments, it should be understood that various other changes, substitutions, and alterations may be made hereto without departing from the spirit and scope of the present invention. For example, although the present invention has been described as operating in a GGSN environment, the present invention may be used in any networking environment that provides some type of accounting for an end user 12. The signaling protocol disclosed in the preceding figures is generally applicable to all communication systems in which information packets are routed between or through IP networks.

Note also that although specific protocols are described herein in this document to illustrate example operations, any suitable communicative platforms may be used to effectuate the operations, which provide appropriate signaling for communication system 10. Elements may relay signaling information to other network elements via any suitable backend control protocol (e.g. GTP', RADIUS, DIAMETER, TACACS, etc.). Additionally, SBLP (as described above) does not have to be associated with GPRS Version 1.0 and may instead be related to any GPRS version and/or any type of data that offers accounting information for end user 12.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for signaling information in a network environment, comprising:
   an access gateway operable to:
      establish two or more packet data protocol (PDP) links on behalf of a mobile station, each of the PDP links associated with a different gate; and
      communicate to a client services packet gateway (CSPG) a message associated with a gate control of a first gate of the access gateway associated with a first PDP link, the gate control of the first gate indicating to the CSPG a change in quality of service level, locale, or policy enforcement relating to the first PDP link, the message allowing the CSPG to control accounting for the first PDP link such that synchronization is achieved between accounting information and a state of the first gate associated with the first PDP link;
   wherein:
      the state of the first gate comprises whether the first gate is open or closed; and
      controlling the accounting for the first PDP link comprises performing, by the CSPG, one of enabling and disabling billing associated with the first PDP link by communicating with a quota server that distributes a quantity of quota to the mobile station via one or more flows.

2. The apparatus of claim 1, further comprising:
   a policy decision function coupled to the access gateway and operable to generate the message that is received by the access gateway.

3. The apparatus of claim 1, wherein the message is provided in a selected one of a group of protocols that consists of:
   a) a RADIUS protocol;
   b) a TACACS protocol;
   c) a GTP' protocol; and
   d) a DIAMETER protocol.

4. The apparatus of claim 1, wherein the CSPG is operable to provide one or more services to the mobile station, the services being selected from a group of services consisting of:
   a) accounting;
   b) firewalling;
   c) filtering;
   d) wireless application protocol transformations;
   e) compression;
   f) optimization;
   g) billing; and
   h) content authorization.

5. The apparatus of claim 1, wherein the message associated with the gate control of the first gate of the access gateway associated with the first PDP link is specifically communicated to relay the status of the first gate indicating to the CSPG a change in quality of service level, locale, or policy enforcement relating to the first PDP link, wherein the message is sent separately from traffic communicated with the mobile station via the first PDP link.

6. An apparatus for signaling information in a network environment, comprising:
   an access gateway operable to;
      receive a quota request message from a client services packet gateway (CSPG), the quota request message associated with a first service of a plurality of services associated with a mobile station;

close a gate associated with the first service of the plurality of services associated with the mobile station; and asynchronously signal to the CSPG to return a portion of quota for a flow associated with the first service associated with the mobile station, wherein the quota request message is operable to communicate an accounting command to indicate that a service level, locale or policy enforcement corresponding to the flow is modified such that synchronization is achieved between accounting information and a state of a gate associated with the first flow;

wherein:
the state of the gate comprises whether the gate is open or closed; and
the accounting command is associated with performing, by the CSPG, one of enabling and disabling billing associated with the mobile station, the accounting command being communicated to a quota server that distributes a quantity of quota to the mobile station via one or more flows.

7. The apparatus of claim 6, wherein the access gateway is signaled that a gate corresponding to the flow is to be closed.

8. The apparatus of claim 6, wherein the command to indicate that a gate corresponding to the flow is open allows accounting for the flow to be initiated.

9. The apparatus of claim 6, wherein a cause segment is included in the signaling that offers a reason for the CSPG for a return of the portion of quota.

10. The apparatus of claim 6, wherein the CSPG is operable to provide one or more services to the mobile station, the services being selected from a group of services consisting of:
a) accounting;
b) firewalling;
c) filtering;
d) wireless application protocol transformations;
e) compression;
f) optimization;
g) billing; and
h) content authorization.

11. An apparatus for signaling information in a network environment, comprising:
a client services packet gateway (CSPG) operable to:
read a flow establishment message communicated by an access gateway, the flow establishment message related to a first flow of a plurality of flows associated with a mobile station, each flow associated with a service of a plurality of services;
determine from the flow establishment message that call information associated with the first flow associated with a first service associated with the mobile station has changed; and
act autonomously, in response to reading the message and determining that call information has changed, by controlling accounting for the flow such that synchronization is achieved between call information and a state of a gate associated with the flow associated with the first service;
wherein:
the state of the gate comprises whether the gate is open or closed; and
controlling the accounting for the flow comprises providing, by the CSPG, an accounting command to perform one of enabling and disabling billing associated with the flow, the accounting command provided to a quota server that distributes a quantity of quota to the mobile station via the first flow.

12. The apparatus of claim 11, further comprising:
a policy decision function coupled to the access gateway and operable to generate the message that is received by the access gateway.

13. The apparatus of claim 11, wherein the message is provided in a selected one of a group of protocols that consists of:
a) a RADIUS protocol;
b) a TACACS protocol;
c) a GTP' protocol;
d) a DIAMETER protocol; and
e) a COPS protocol.

14. The apparatus of claim 11, wherein the CSPG is operable to provide one or more services to the mobile station, the services being selected from a group of services consisting of:
a) accounting;
b) firewalling;
c) filtering;
d) wireless application protocol transformations;
e) compression;
f) optimization;
g) billing; and
h) content authorization.

15. The apparatus of claim 11, wherein the CSPG is operable to respond to the message by analyzing accounting rules for down-link packets, and wherein if there is correspondence between a down-link rule and a packet classification corresponding to a closed gate then the CSPG disables an accounting functionality for the flow.

16. The apparatus of claim 15, wherein the CSPG is operable to respond to the message by analyzing the accounting rules for the down-link packets such that if the accounting rules indicate a previously disabled charging rule corresponding to an open gate, then the CSPG can enable the accounting functionality for the flow.

17. A method for signaling information in a network environment, comprising:
establishing, via an access gateway, two or more packet data protocol (PDP) links on behalf of a mobile station, each of the PDP links associated with a different gate; and
communicating, by the access gateway to a client services packet gateway (CSPG), a message associated with a gate control of a first gate of the access gateway associated with a first PDP link, the gate control of the first gate indicating to the CSPG a change in quality of service level, locale, or policy enforcement relating to the first PDP link, the message allowing the CSPG to control accounting for the first PDP link such that synchronization is achieved between accounting information and a state of the first gate associated with the first PDP link;
wherein:
the state of the first gate comprises whether the first gate is open or closed; and
controlling the accounting for the first PDP link comprises performing, by the CSPG, one of enabling and disabling billing associated with the first PDP link by communicating with a quota server that distributes a quantity of quota to the mobile station via one or more flows.

18. The method of claim 17, further comprising:
generating the message that is received by the CSPG.

19. The method of claim 17, wherein the message is provided in a selected one of a group of protocols that consists of:
a) a RADIUS protocol;
b) a TACACS protocol;

c) a GTP' protocol; and
d) a DIAMETER protocol.

20. The method of claim 17, further comprising:
distributing a quantity of quota to the mobile station via one or more flows.

21. A method for signaling information in a network environment, comprising:
receiving at an access gateway a quota request message from a client services packet gateway (CSPG), the quota request message associated with a first service of a plurality of services associated with a mobile station;
responding to the quota request message by signaling to the CSPG to return a portion of quota for a flow associated with the first service associated with the mobile station; and
transmitting a second quota message from the access gateway to the CSPG, the quota request messages communicating an accounting command to indicate that a state of a gate corresponding to the flow is changed such that synchronization is achieved between accounting information and the state of the gate associated with the flow;
wherein:
the state of the gate comprises whether the gate is open or closed; and
the accounting command is associated with performing one of enabling and disabling billing associated with the mobile station, the accounting command being communicated to a quota server that distributes a quantity of quota to the mobile station via the flow.

22. The method of claim 21, further comprising:
signaling that the gate corresponding to the flow is to be closed.

23. The method of claim 21, wherein the command to indicate that the gate corresponding to the flow is open allows accounting for the flow to be initiated.

24. The method of claim 21, further comprising:
providing a cause segment that is included in the signaling, the cause segment offering a reason for the CSPG for a return of the portion of quota.

25. A method for signaling information in a network environment, comprising:
reading, at a client services packet gateway (CSPG), a flow establishment message communicated by an access gateway, the flow establishment message related to a first flow of a plurality of flows associated with a mobile station, each flow associated with a service of a plurality of services;
determining by the CSPG from the flow establishment message that call information associated with the flow associated with the first service associated with the mobile station has changed; and
acting autonomously, by the CSPG in response to reading the message and determining that call information has changed, by providing from the CSPG an accounting command to control accounting for the flow such that synchronization is achieved between call information and a state of a gate associated with the flow associated with the first service;
wherein:
the state of the gate comprises whether the gate is open or closed; and
the accounting command is associated with performing, by the CSPG, one of enabling and disabling billing associated with the flow, the accounting command being communicated to a quota server that distributes a quantity of quota to the mobile station via the flow.

26. The method of claim 25, further comprising:
generating the message that is received by the access gateway.

27. The method of claim 25, wherein the message is provided in a selected one of a group of protocols that consists of:
a) a RADIUS protocol;
b) a TACACS protocol;
c) a GTP' protocol;
d) a DIAMETER protocol; and
e) a COPS protocol.

28. The method of claim 25, further comprising:
providing one or more services to the mobile station, the services being selected from a group of services consisting of:
a) accounting;
b) firewalling;
c) filtering;
d) wireless application protocol transformations;
e) compression;
f) optimization;
g) billing; and
h) content authorization.

29. The method of claim 25, further comprising:
responding to the message by analyzing accounting rules for down-link packets, wherein if there is correspondence between a down-link rule and a packet classification corresponding to a closed gate then an accounting functionality is disabled for the flow.

30. The method of claim 25, further comprising:
responding to the message by analyzing the accounting rules for the down-link packets such that if the accounting rules indicate a previously disabled charging rule corresponding to an open gate, then the accounting functionality is enabled for the flow.

* * * * *